(12) United States Patent
Liu et al.

(10) Patent No.: US 10,521,415 B2
(45) Date of Patent: Dec. 31, 2019

(54) METHOD AND SYSTEM FOR PROVIDING WEIGHTED EVALUATION

(71) Applicant: FACEBOOK, INC., Menlo Park, CA (US)

(72) Inventors: Youzhong Liu, Cupertino, CA (US); Yunkai Zhou, Los Altos, CA (US); Jian Huang, Redwood City, CA (US); Yue Kwen Justin Yip, Sunnyvale, CA (US)

(73) Assignee: Facebook, Inc., Menlo Park, CA (US)

( * ) Notice: Subject to any disclaimer, the term of this patent is extended or adjusted under 35 U.S.C. 154(b) by 303 days.

(21) Appl. No.: 15/589,759

(22) Filed: May 8, 2017

(65) Prior Publication Data

US 2017/0322968 A1    Nov. 9, 2017

Related U.S. Application Data

(60) Provisional application No. 62/332,834, filed on May 6, 2016.

(51) Int. Cl.
  *G06F 16/23*    (2019.01)
  *G06F 16/28*    (2019.01)
  *G06F 16/2457*   (2019.01)

(52) U.S. Cl.
  CPC ...... *G06F 16/235* (2019.01); *G06F 16/24578* (2019.01); *G06F 16/282* (2019.01)

(58) Field of Classification Search
  CPC . G06F 16/24578; G06F 16/235; G06F 16/282
  USPC ....................................................... 707/625
  See application file for complete search history.

(56) References Cited

U.S. PATENT DOCUMENTS

| | | | |
|---|---|---|---|
| 9,031,951 B1* | 5/2015 | Baluja | G06F 16/437 707/737 |
| 2005/0131951 A1 | 6/2005 | Zhang et al. | |
| 2006/0224577 A1 | 10/2006 | Hullender et al. | |
| 2013/0144593 A1 | 6/2013 | Och et al. | |
| 2013/0254294 A1* | 9/2013 | Isaksson | G06Q 10/101 709/204 |

(Continued)

OTHER PUBLICATIONS

International Search Report and Written Opinion for Application No. PCT/US2017/031603, dated Sep. 14, 2017, 11 pages.

(Continued)

*Primary Examiner* — Evan Aspinwall
(74) *Attorney, Agent, or Firm* — Sheppard Mullin Richter & Hampton LLP

(57) ABSTRACT

Systems and methods are disclosed for providing weighted evaluation. The system may comprise one or more processors and a memory storing instructions that, when executed by the one or more processors, cause the system to obtain a plurality of data point groups, obtain an inbound rank of each data point group based on one or more inbound ranks of one or more data groups linking to the data point group, obtain an outbound rank of the each data point group based on one or more outbound ranks of one or more data groups linked from the each data point group, obtain a group rank of the each data point group based on the inbound rank and the outbound rank of the each data point group, and process the data point groups according to the corresponding group ranks.

20 Claims, 7 Drawing Sheets

(56) References Cited

U.S. PATENT DOCUMENTS

2015/0039539 A1* 2/2015 Shivashankar ........ G06N 20/00
  706/12
2015/0081725 A1* 3/2015 Ogawa ................... G06Q 50/01
  707/754

OTHER PUBLICATIONS

PCT International Preliminary Report on Patentability dated Nov. 15, 2018, issued in related International Application No. PCT/US2017/031603 (8 pages).

* cited by examiner

400

402: Obtain a plurality of data point groups, wherein each data point group comprises one or more data points, one or more of the data points are linked data points, one or more of the data points are linking data points, and each of the linked points is pointed to by a link from one or more of the linking data points

404: Obtain an inbound rank of each data point group based on one or more inbound ranks of one or more data groups linking to the data point group

406: Obtain an outbound rank of the each data point group based on one or more outbound ranks of one or more data groups linked from the each data point group

408: Obtain a group rank of the each data point group based on the inbound rank and the outbound rank of the each data point group

410: Process the data point groups according to the corresponding group ranks

422: Obtain a plurality of data point groups comprising a first data point group A and a second data point group B, wherein each data point group comprises one or more data points, one or more of the data points are linked data points, one or more of the data points are linking data points, and each of the linked points is pointed to by a link from one or more of the linking data points

424: Determine a connection weight between the first data point group and the second data point group, wherein the connection weight is based on a closeness of connection between one or more data points in the first data point group and one or more data points in the second data point group and based on a degree of evaluation of one or more data points from the first and second data point groups

426: In response to determining the connection weight being over a preset threshold, merge the first and the second data point groups to obtain a merged data point group

FIGURE 4B

METHOD AND SYSTEM FOR PROVIDING WEIGHTED EVALUATION

CROSS-REFERENCE TO RELATED APPLICATIONS

This application claims the benefit of U.S. Provisional Application Ser. No. 62/332,834, filed May 6, 2016, and entitled "METHOD AND SYSTEM FOR PROVIDING WEIGHTED EVALUATION." The entirety of the aforementioned application is incorporated herein by reference.

FIELD OF THE INVENTION

This disclosure relates to approaches for providing weighted evaluation.

BACKGROUND

Data ranking and relationship structuring is important for various applications, such as data searching, data architecture, relation mapping, and data mining. In many situations of having significantly large data volumes, it is desirable to rank data points or data group in meaningful ways for convenient processing and various other applications.

SUMMARY

Various embodiments of the present disclosure can include systems, methods, and non-transitory computer readable media configured to provide weighted evaluation. Such system may comprise one or more processors and a memory storing instructions that, when executed by the one or more processors, cause the system to obtain a plurality of data point groups, obtain an inbound rank of each data point group based on one or more inbound ranks of one or more data groups linking to the data point group, obtain an outbound rank of the each data point group based on one or more outbound ranks of one or more data groups linked from the each data point group, obtain a group rank of the each data point group based on the inbound rank and the outbound rank of the each data point group, and process the data point groups according to the corresponding group ranks. Each data point group may comprise one or more data points, one or more of the data points may be linked data points, one or more of the data points may be linking data points, and each of the linked points may be pointed to by a link from one or more of the linking data points.

In some embodiments, to obtain the inbound rank of the data point group, the systems, methods, and non-transitory computer readable media are configured to iteratively obtain the inbound rank based on one or more inbound ranks of one or more other data point groups until a change in the iteration is below a preset threshold. To obtain the outbound rank of the data point group, the systems, methods, and non-transitory computer readable media are configured to iteratively obtain the outbound rank based on one or more outbound ranks of one or more other data point groups until a change in the iteration is below another preset threshold.

In some embodiments, the plurality of data point groups comprise a first and a second data point groups. To process the first and the second data point groups, the systems, methods, and non-transitory computer readable media are configured to determine a connection weight between the first data point group and the second data point group, and in response to determining the connection weight being over a preset threshold, merge the first and the second data point groups to obtain a merged data point group.

In some embodiments, the connection weight between the first data point group A and the second data point group B comprises W(AB) and W(BA), W(AB) is based on an interaction weight I(AB) and a quality weight Q(AB), the interaction weight I(AB) represents a closeness of connection between one or more data points in A and one or more data points in B, and the quality weight Q(AB) represents a degree of evaluation of one or more data points in B by one or more data points in A.

In some embodiments, the connection weight between the first and the second data point groups is larger than any other connection weight between the first data point group and another data point group.

In some embodiments, to process the first and the second data point groups, the systems, methods, and non-transitory computer readable media are configured to obtain an inbound rank and an outbound rank of the merged data point group, update inbound and outbound ranks of all of the data point groups other than the first and second point groups, and remove the first and second data point groups.

In some embodiments, to process the first and the second data point groups, the systems, methods, and non-transitory computer readable media are configured to obtain a connection weight of the merged data point group. The connection weight of the merged data point group is a weighted average of a connection weight with respect to the first data point group and another connection weight with respect to the second data point group.

In some embodiments, the preset threshold for the connection weight is based on a computing method of the connection weight of the merged data point group.

In some embodiments, the systems, methods, and non-transitory computer readable media are configured to perform the connection weight determination and the merge for two or more other data point groups.

In some embodiments, a computer-implemented method implemented by a computing system including one or more processors and storage media storing machine-readable instructions, may comprise obtaining a plurality of data point groups, obtaining an inbound rank of each data point group based on one or more inbound ranks of one or more data groups linking to the data point group, obtaining an outbound rank of the each data point group based on one or more outbound ranks of one or more data groups linked from the each data point group, obtaining a group rank of the each data point group based on the inbound rank and the outbound rank of the each data point group, and processing the data point groups according to the corresponding group ranks. Each data point group may comprise one or more data points, one or more of the data points may be linked data points, one or more of the data points may be linking data points, and each of the linked points may be pointed to by a link from one or more of the linking data points.

In some embodiments, a non-transitory computer readable medium may comprise instructions that, when executed, cause one or more processors to obtain a plurality of data point groups comprising a first data point group and a second data point group, determine a connection weight between the first data point group and the second data point group, and in response to determining the connection weight being over a preset threshold, merge the first and the second data point groups to obtain a merged data point group. Each data point group may comprise one or more data points, one or more of the data points are linked data points, one or more of the data points are linking data points, and each of the linked points is pointed to by a link from one or more of the linking data points. The connection weight may be based on a closeness of connection between one or more data points in the first data point group and one or more data points in the second data point group and based on a degree of evaluation of one or more data points from the first and second data point groups.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings of which:

FIG. 4A illustrates a flowchart of an example method for providing weighted evaluation, according to embodiments of the present disclosure.

FIG. 4B illustrates a flowchart of another example method for providing weighted evaluation, according to embodiments of the present disclosure.

Figure 1:
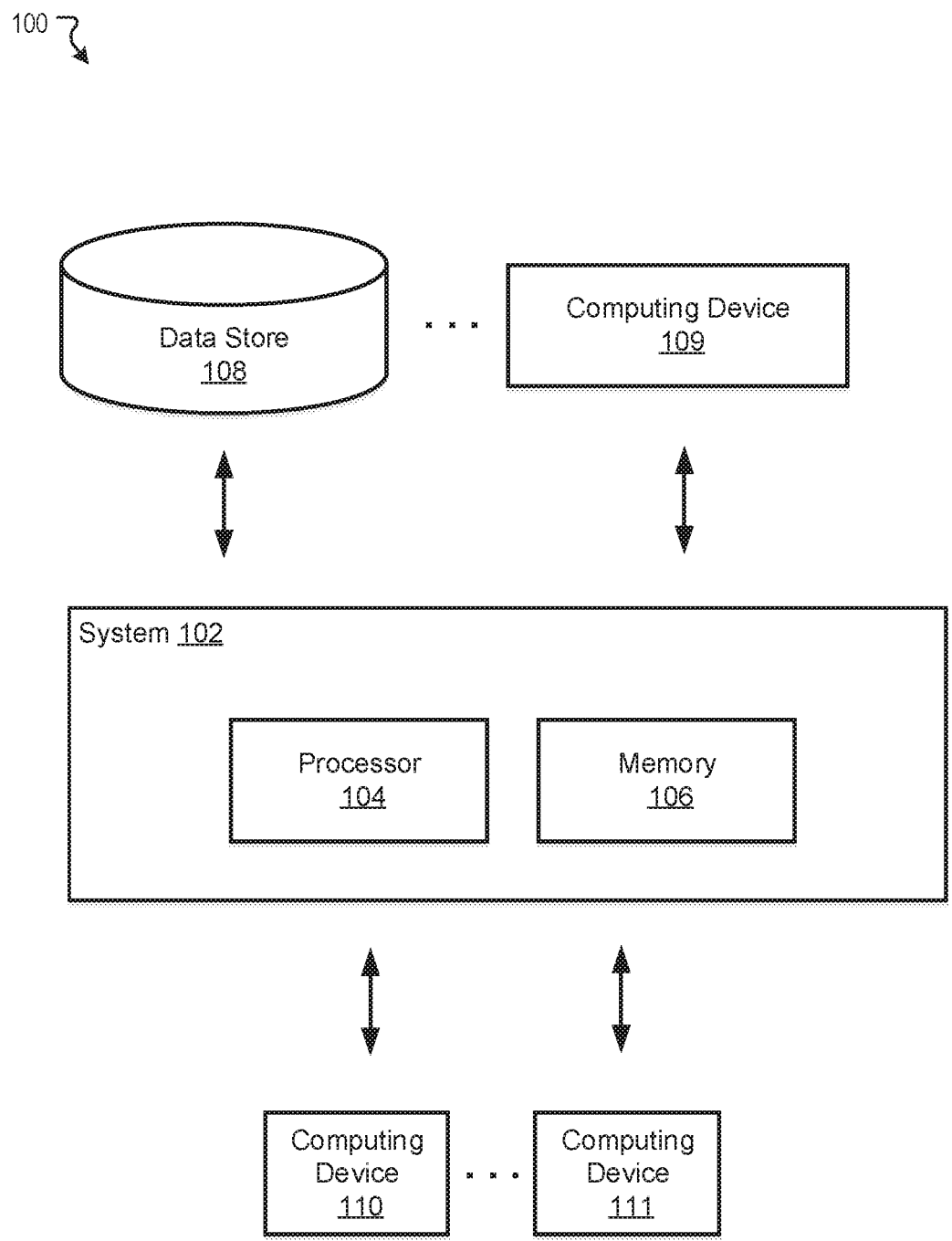
FIG. 1 illustrates a block diagram of an example of a system for providing weighted evaluation, according to embodiments of the present disclosure.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Data ranking and structuring are challenging in the field of computing technologies, particularly when the data size is large. In many applications, it may be desirable to rank and group data points in order to selectively feed information, apply condition, or otherwise manipulate the data point groups. For example, each data point may represent a person, and traditional methods can only perform simple categorization based on parameters such as geographic locations, gender, etc. It has been challenging to group the people based on internal interactions, such as evaluations provided among themselves.

Various embodiments described below can overcome such problems arising in the realm of computing technologies. In various embodiments, computing systems, methods, and non-transitory computer readable media are disclosed for providing weighted evaluation. For example, such computing system may comprise one or more processors and a memory storing instructions that, when executed by the one or more processors, cause the system to perform the method for providing weighted evaluation. For another example, a non-transitory computer readable medium may comprise instructions that, when executed, cause one or more processors to perform the method for providing weighted evaluation.

In various embodiments, the systems, methods, and non-transitory computer readable media may be configured to obtain a plurality of data point groups, obtain an inbound rank of each data point group based on one or more inbound ranks of one or more data groups linking to the data point group, obtain an outbound rank of the each data point group based on one or more outbound ranks of one or more data groups linked from the each data point group, obtain a group rank of the each data point group based on the inbound rank and the outbound rank of the each data point group, and process the data point groups according to the corresponding group ranks. Each data point group may comprise one or more data points, one or more of the data points may be linked data points, one or more of the data points may be linking data points, and each of the linked points may be pointed to by a link from one or more of the linking data points.

In various embodiments, the systems, methods, and non-transitory computer readable media may be configured to obtain a plurality of data point groups comprising a first data point group and a second data point group, determine a connection weight between the first data point group and the second data point group, and in response to determining the connection weight being over a preset threshold, merge the first and the second data point groups to obtain a merged data point group. Each data point group may comprise one or more data points, one or more of the data points are linked data points, one or more of the data points are linking data points, and each of the linked points is pointed to by a link from one or more of the linking data points. The connection weight may be based on a closeness of connection between one or more data points in the first data point group and one or more data points in the second data point group and based on a degree of evaluation of one or more data points from the first and second data point groups.

FIG. 1 illustrates an example environment 100 for providing weighted evaluation, in accordance with various embodiments. As shown in FIG. 1, the example environment 100 can comprise at least one computing system 102 that includes one or more processors 104 and memory 106. The memory 106 may be non-transitory and computer-readable. The memory 106 may store instructions that, when executed by the one or more processors 104, cause the one or more processors 104 to perform various methods described herein.

The environment 100 may include one or more data stores (e.g., a data store 108) and one or more computing devices (e.g., a computing device 109) that are accessible to the system 102. In some embodiments, the system 102 may be configured to obtain data points from the data store 108 and/or the computing device 109. For example, the computing device 109 may be a mobile phone or computer configured to capture, store, and transmit data points.

The environment 100 may further include one or more computing devices coupled to the system 102 (e.g., computing devices 110 to 111). The computing devices may include, for example, cellphones, tablets, computers, wearable devices (smart watch), etc. The computing devices may transmit data to or receive data from the system 102.

Although the system 102 is shown as a single component in this figure, it is appreciated that the system 102 can be implemented as a single device or multiple devices (e.g., computers, servers, etc.) coupled together. For example, the system 102 may be implemented as multiple computers, multiple servers, or a computer-server combination.

In some embodiments, the system 102 and one or more of the computing devices (e.g., a computing device 109) may be integrated in a single device or system. Alternatively, the system 102 and the computing devices may operate as separate devices. For example, the computing devices 109, 110, and 111 may be computers or mobile phones, and the system 102 may be a server. The data store(s) may be anywhere accessible to the system 102, for example, in the memory 106, in the computing device 109, 110, or 111, in another device (e.g., network storage device) coupled to the system 102, or another storage location (e.g., cloud-based storage system, network file system, etc.), etc. In general, the system 102, the computing devices 109, 110, and 111, and the data store 108 may be able to communicate with one another through one or more wired or wireless networks (e.g., the Internet) through which data can be communicated. Various aspects of the environment 100 are described below in reference to FIG. 2 to FIG. 5.

Figure 2:
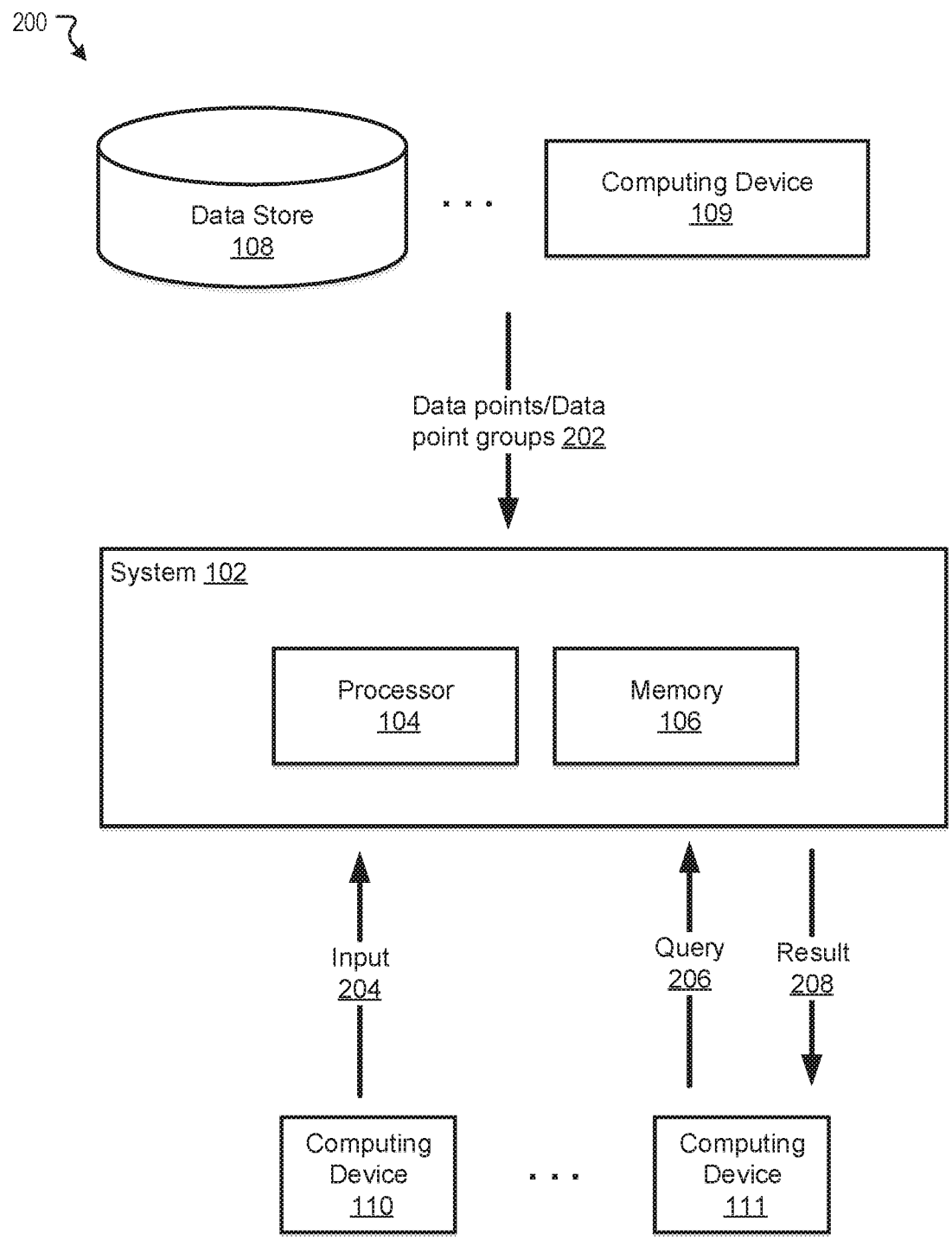
FIG. 2 illustrates a block diagram of an example approach for providing weighted evaluation, according to embodiments of the present disclosure.

FIG. 2 illustrates an example system 200 for providing weighted evaluation, in accordance with various embodiments. The operations shown in FIG. 2 and presented below are intended to be illustrative. In various embodiments, the system 102 may obtain one or more data points and/or data point groups 202 from the data store 108 and/or the computing device 109. Each data point group may comprise one or more data points. Each data point may associate with an entity, such as a person, a user, an account associated with a person, an organization (e.g., a corporation, a company, a school, a government branch), etc. The obtained data point (e.g., data point A) may comprise information such as the identity of the data point and one or more evaluations (e.g., an evaluation of the data point A by another data point, an evaluation of another data point by the data point A, etc.). The obtained data points and data point groups may be stored in the memory 106.

In addition to obtaining the data points and data point groups 202, the system 102 may receive an input 204 from one or more computing devices (e.g., computing device 110). The input 204 may comprise evaluation(s) of one or more data points. For example, the system 102 may first obtain users A and B's information from the data store 108, and user A may use computing device 110 to input an evaluation of user B. Alternatively, a third-party may transmit user A's evaluation of user B via the input 204.

In some embodiments, the system 102 may rank or otherwise process the obtained data points and/or data point groups based on the obtained evaluations. Further, the system 102 may merge data points and/or data point groups based on the obtained evaluations. More details of the data points, evaluations, ranking, and merge are described below with reference to FIGS. 3A-3B. Based on the ranking and merge, the system 102 can properly group or otherwise structure the data points for various applications. For example, computer device 111 may send a query 206 to the system 102 to obtain a result 208 associated with the structured data.

In one example, each of the data points may be associated with a person or organization, and the system 102 can be implemented as a platform for providing weighted evaluation among people and organizations. The system 102 may group, merge, rank, or otherwise structure the people and organization data. For example, the data points obtained by the system 102 may be known as a data point set and may be each associated with a person. Some of the people may know one or more other people in data point set, and may provide evaluations of one or more people in the data point set, both interactions of which may be characterized as links and connection weights among corresponding data points. The links with respect to a data point may comprise inbound links and outbound links. The connection weights with respect to a data point may comprise inbound connection weights and outbound connection weights. Inbound links and connection weights may associate with evaluations provided by other data points, and outbound links and weights may associate with evaluations provided to other data points. Based on the links, the data points or data point groups can be ranked. (Multiple links in the same direction to or from each data point can be weighted.) Further, based on the connection weights, data points or data point groups having strong interactions can be identified and merged together. Merged data points can be treated as a merged data point group, and the inbound and outbound links and connection weights can be updated accordingly. The calculation-merge-update process can be performed iteratively by a specialized algorithm until changes become smaller than a preset threshold. In the meanwhile, the system 102 may obtain more data points, obtain more evaluations among the data points, and incorporate them into the iteration. The specialized algorithm may be configured to achieve up to a reasonable size for each data point group, for example, the square root of the total number of data points of the data point set.

In a more specific example, the people represented by the data points may be of various trades and professions. The links and connection weights, inbound or outbound, may be associated with evaluations among the people. Each connection weight may comprise two types: (1) how well two people or two groups of people know each other, and (2) how highly one person think of another person or one group of people think of another group (e.g., professionally, academically, personally, etc.). For example, two lawyers friends value each other professionally may be determined to have a high connection weight and may be merged together to obtain a group L. Similarly, other lawyers may be merged to group L. Group L can be ranked among various data point groups based on links to and from group L. If the links indicate that group L have the highest ranking among lawyers, group L may become a group of top-notch lawyers. With that, various application can be realized. For example, if a client needs legal services and is willing to pay for top-level services, the client can send a request/query to the group L and obtain responses/results (e.g., lawyer recommendations, case proposals, etc.).

As such, isolated data points can be organized and ranked automatically for various applications. Specialized algorithms building off interactions among the data points such as weighted evaluations among people can provide realistic grouping and ranking. Fraud can be minimized by weighing the number and variety of inbound evaluations against the average.

Figure 3A:
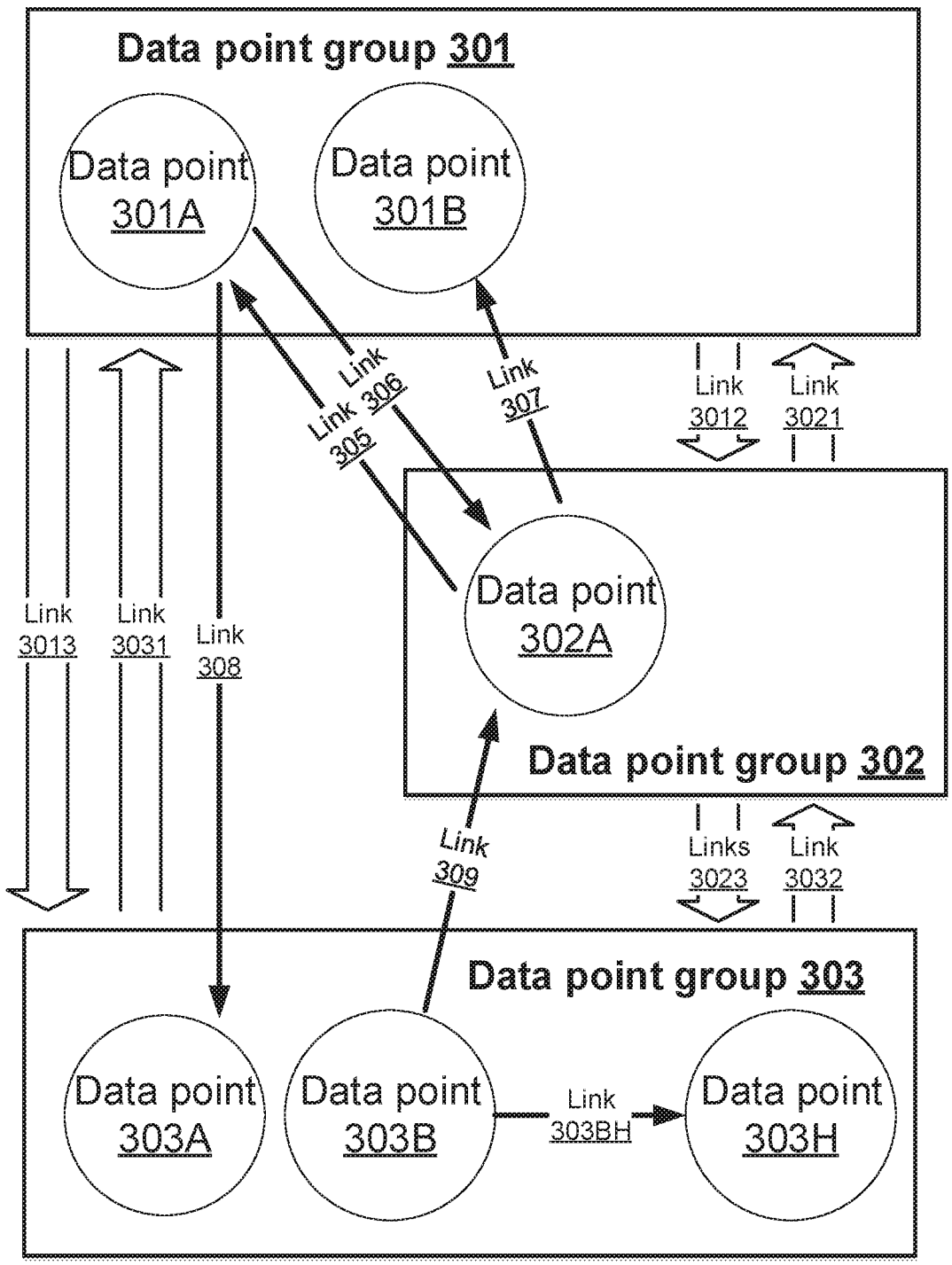
FIGS. 3A-3B illustrate block diagrams of an example approach for providing weighted evaluation, according to embodiments of the present disclosure.
Figure 3B:
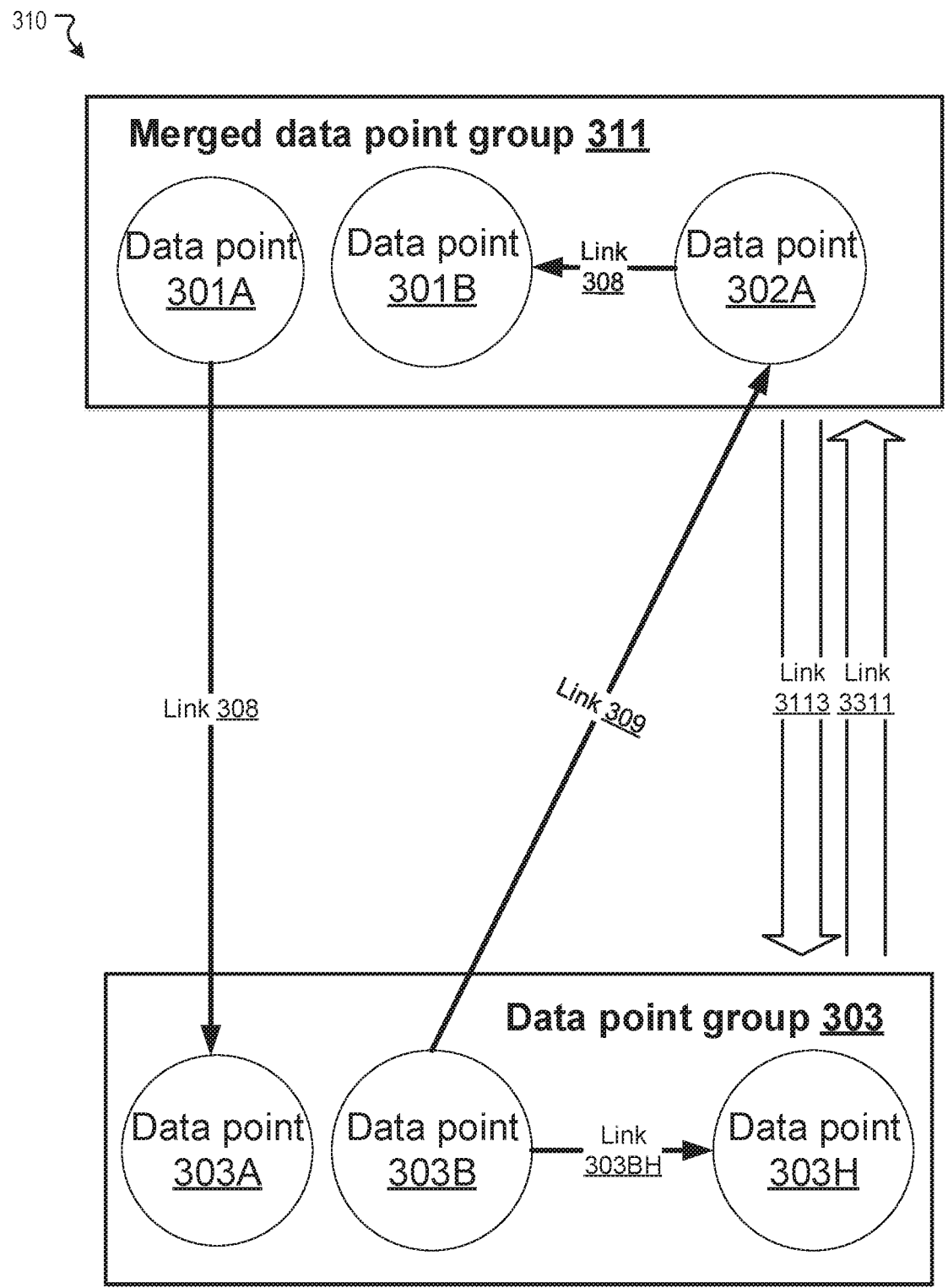

FIGS. 3A-3B illustrate block diagrams 300 and 310 of an example approach for providing weighted evaluation, according to embodiments of the present disclosure. The block diagrams 300 and 310 may be known as weighted directional graphs or portions thereof. The example approach may be implemented in various environments including, for example, the environment 100 of FIG. 1. The example approach may be implemented by one or more components of the system 102 (e.g., the processor 104, the memory 106). The description of FIGS. 3A-3B is intended to be illustrative and may be modified in various ways according to the implementation. A person skilled in the art would appreciate the description herein as to enable training of the model for language-based service hailing.

In some embodiments describing an overall algorithm, for each iteration, the inbound and outbound ranks of data point groups (described below as IR(G) and OR(G)) can be obtained. Then, it can be decided whether to merge two data point groups based on their connection weight (described below as, for example, the sum of W(GN) and W(NG)). In case of merging, the iteration may be continued. In case of no merging, the iteration may be continued only when the inbound rank and/or outbound rank change over a preset threshold. The iteration may stop when there is no more merging and no more large rank change more than the preset threshold. The connection weight determination and the merge may be performed for all data point groups. The ranks are described in details with reference to FIG. 3A, and the connection weight is described in details with reference to FIG. 3B.

As discussed above, each data point described in this disclosure may be associated with an entity (e.g., a person, an organization, etc.). For example, each data point may be associated with a user of the system 102. In some embodiments, as shown in FIG. 3A, the system 102 may obtain a plurality of data point groups 301, 302, and 303. Each data point group may comprise one or more data points. For example, the data point group 301 may comprise data points 301A and 301B, the data point group 302 may comprise data point 302A, and the data point group 303 may comprise data points 303A, 303B, and 303C. One or more of the data points may be linked data points (e.g., data points 301A, 301B, 302A, and 303A). One or more of the data points may be linking data points (e.g., data points 301A, 302A, and 303B). Each of the linked points may be pointed to by a link from one or more of the linking data points (e.g., linked data point 301A is pointed to by a link 305 from linking data point 302A, linked data point 302A is pointed to by a link 306 from linking data point 301A, linked data point 301B is pointed to by a link 307 from linking data point 302A, linked data point 303A is pointed to by a link 308 from linking data point 301A, linked data point 302A is pointed to by a link 309 from linking data point 303B). In addition, the system 102 may obtain links among data points in the same data point group (e.g., link 303BH pointing from data point 303B to data point 303H). For simplicity, most links among data points in the same data point group are not shown in FIGS. 3A and 3B.

In some embodiments, connection weights can be represented by links. Each link may comprise one or more sub-links each representing an interaction between two data points. For example, in FIG. 3A, data point 301A may represent user M, data point 303A may represent user N, and link 308 may comprise a first sub-link representing how well user M knows user N and a second sub-link representing how highly user M thinks of user N (e.g., professionally, in a certain field, regarding a certain skill, etc.). For simplicity, the sub-links are not shown. A person of ordinary skill in the art would appreciate the importance of the directions of the arrows. With respect to a data point, a link pointing to the data point is inbound, and a link pointing from the data point is outbound. For example, link 305 and link 306 each involves the same two parties, but are exactly the opposite. The system 102 may obtain the links from various inputs as discussed above with reference to FIG. 2.

The system 102 may obtain links among data point groups based on the links among data points. Links among data point groups are similar to the links among data points. For example, each of the linked data point groups may be pointed to by a link from one or more of the linking data point groups (e.g., linked data point group 301 is pointed to by link 3021 from linking data point group 302, linked data point group 301 is pointed to by link 3031 from linking data point group 303, linked data point group 302 is pointed to by link 3032 from linking data point group 303, linked data point group 302 is pointed to by link 3012 from linking data point group 301, linked data point group 303 is pointed to by link 3013 from linking data point group 301, linked data point group 303 is pointed to by link 3023 from linking data point group 302). A link between two data point groups may be based on weighted links between data points in the two data point groups. For example, link 3021 may be based on weighted links 305 and 307.

In some embodiments, ranks of each data point group can be obtained based on one or more linked and/or linking data point groups. For example, the system 102 may obtain an inbound rank of each data point group based on one or more inbound ranks of one or more data groups linking to the data point group and obtain an outbound rank of the each data point group based on one or more outbound ranks of one or more data groups linked from the each data point group. With respect to FIG. 3A, the system 102 may obtain an inbound rank of the data point group 301 based on inbound ranks of the data point groups 302 and 303, if no other data point group links to the data point group 301.

In some embodiments, the system 102 may obtain various data points each constituting a data point group, and perform the disclosed methods to gradually merger a few data points. Therefore, FIG. 3A may provide an example data structure after a few iterations.

In some embodiments, to obtain the inbound rank of the data point group, the system 102 may iteratively obtain the inbound rank based on one or more inbound ranks of one or more other data point groups until a change in the iteration is below a preset threshold. To obtain the outbound rank of the data point group, the system 102 may iteratively obtain the outbound rank based on one or more outbound ranks of one or more other data point groups until a change in the iteration is below another preset threshold. The system 102 may further obtain a group rank of the each data point group based on the inbound rank and the outbound rank of the each data point group, and process the data point groups according to the corresponding group ranks.

The iteration and ranking algorithm can be expressed as the following:

Inbound rank: $IR(G) = \alpha \times IR(G) + (1-\alpha) \times \Sigma_{X \in IN(G)} \omega \times IR(X)$ Outbound rank: $OR(G) = \beta \times IR(G) + (1-\beta) \times \Sigma_{X \in ON(G)} \omega \times OR(X)$ Group rank: $R(G) = \gamma \times IR(G) + (1-\gamma) \times OR(G)$ In this example, G is a data point group of interest (or known as a "galaxy"), and X are data point group(s) pointing to or from the data point group G. IR(G) is an inbound rank of G, OR(G) is an outbound rank of G, and R(G) is a group rank of G (or known as an overall ranking among all data point groups). IN(G) are data points or data point groups connected by inbound links of G (e.g., pointing to G), and ON(G) are data points or data point groups connected by outbound links of G (e.g., pointing from G). $\alpha$ is an inbound rank regression coefficient, $\beta$ is an outbound rank regression coefficient, and $\gamma$ is an inbound-outbound balance coefficient. $\omega$ is a contribution coefficient, which can be a constant or a function of the number of outbound links of X. For example, if G is pointed by to M and N and M=2N, $\omega$ for M may be ⅔, and $\omega$ for N may be ⅓.

The above method is distinguished from and better than page rank algorithms in at least three aspects. First, page rank algorithms only calculate inbound links to weigh data points, whereas the disclosed systems and methods use both inbound and outbound links to weigh data points. Thus, bi-directional interactions among data points such as weighted evaluation can be more accurately characterized to define the data structure. Second, page rank algorithms only apply to single data points, whereas the disclosed methods and systems are applicable to data point groups comprising multiple data points. Thus, grouping of data points and ranking of data point groups can be achieved accurately. Third, page rank does not adequately describe the merge situation between data point groups, which is enabled by the disclosed methods.

In some embodiments, a steady state may be reach when the change of rank for each iteration falls below the preset threshold, and a number of iterations till reaching the steady state may be associated with a rate of convergence. The coefficients $\alpha$, $\beta$, and $\gamma$ may be tuned to reach a reasonably fast rate of convergence. Further, the coefficients $\alpha$, $\beta$ and $\gamma$ may be tuned to achieve an optimal data point group size (e.g., the number of data point in each data point group may be up to the square root of the number of total data points).

Although FIG. 3A shows that the system 102 may obtain a data point group comprising multiple data points, the system 102 may obtain a data point group comprising a single data point. That is, the system 102 may obtain isolated data points each treated as a data point group. Thus, at this stage, links between data points are links between data point groups. The system 102 may obtain connection weights and merge multiple data points, and accordingly update the links between data point groups as described below.

In some embodiments, the plurality of data point groups comprise a first data point group 301 and a second data point group 302. To process the first and the second data point groups, the system 102 may determine a connection weight between the first data point group and the second data point group, and in response to determining the connection weight being over a preset threshold, merge the first and the second data point groups to obtain a merged data point group 311, as shown in FIG. 3B.

In some embodiments, interactions among two data point groups (one of which may comprise a single data point) may be higher than average, and a high level merging algorithm can be expressed as:

```
data point groups_to_be_merged = all_data point groups
sort data point groups_to_be_merged by size (number of
  data points within)
while data point groups_to_be_merged is not empty {
    data point group G = first from data point groups_to_be_merged
    find neighbor_data point groups of data point group G, and sort by
```

```
    connection_weight
    data point group N = first from neighbor_data point groups
    if (connection_weight(G, N) is large enough) {        // Line A
        data point group G' = G + N
        rank for all data points in G'
        update inbound / outbound ranks for all neighboring data
point groups of G and N                               //Line B
        delete G from data point groups_to_be_merged
        delete N from data point groups_to_be_merged
    } else {
        delete G from data point groups_to_be_merged
    }
}
```

In some embodiments, the connection weight between the first data point group A and the second data point group B comprises W(AB) and W(BA), W(AB) is based on an interaction weight I(AB) and a quality weight Q(AB), the interaction weight I(AB) represents a closeness of connection between one or more data points in A and one or more data points in B, and the quality weight Q(AB) represents a degree of evaluation of one or more data points in B by one or more data points in A. W(BA) can be similarly obtained.

In one example, the connection weight between the first data point group A and the second data point group B is W(AB)+W(BA), W(AB)=I(AB)×Q(AB), and W(BA)=I(BA)×Q(BA). If A and B may represents people and groups of people, I(AB) may represent how well A knows B, Q(AB) may represent how highly A thinks of B, I(BA) may represent how well B knows A, and Q(BA) may represent how highly B thinks of A. It may be determined that I(AB), Q(AB), I(BA), and Q(BA) are each within the range between 0 and 1.

In some embodiments, as shown in the pseudocode, the connection weight between the first and the second data point groups is larger than any other connection weight between the first data point group and another data point group. That is, a data point group may be merged with another group of the largest degree of interaction.

In some embodiments, to process the first and the second data point groups, the system 102 may obtain an inbound rank and an outbound rank of the merged data point group, update inbound and outbound ranks of all of the data point groups other than the first and second point groups, and remove the first data point group 301 and second data point group 302. For example, the links between the merged data point group 311 and the data point group 303 are updated to be links 3311 and 3113. The links 308 and 309 are similar as before, with data points 301A and 302A merged to the same data point group. Link 308 between data points 301B and 302A is now within the merged data point group 311. For simplicity, other links among data points in the same data point group are not shown here.

In some embodiments, to process the first and the second data point groups, the system 102 may obtain a connection weight of the merged data point group. The connection weight of the merged data point group is a weighted average of a connection weight with respect to the first data point group and another connection weight with respect to the second data point group. In some embodiments, the preset threshold for the connection weight is based on a computing method of the connection weight of the merged data point group.

In one example, referring to the pseudocode where data point groups G and N are merged to obtain a merged data point group G', assuming that data point group X links from both original data point groups G and N, and data point group Y links to both original data point groups G and N, a connection weight of G' can be obtained as the following, with the size of the data point group being the number of data points of the data point group:

Outbound connection weight of $G'$: $W(G'X) =$
$$\frac{W(GX) \times \text{Size}(G) + W(NX) \times \text{Size}(N)}{\text{Size}(G) + \text{Size}(N)}$$

Inbound connection weight of $G'$: $W(YG') =$
$$\frac{W(YG) \times \text{Size}(G) + W(YN) \times \text{Size}(N)}{\text{Size}(G) + \text{Size}(N)}$$

Based on the algorithms for the inbound and outbound connection weights for G', the connection weight (G, N) in Line A of the pseudocode may be:

$$W(GN) + W(NG) \geq 1$$

That is, Line A may depend on Line B, and Line A may determine if two data point groups are close enough to be merged. In this example, W(GN) and W(NG) are each within the range [0, 1], W(GN)=1 may indicate that G absolutely knows N and thinks of N at the highest level, and W(GN)=0 may indicate that G does not know N at all and thinks of N at the lowest level. Therefore, the largest value of W(GN)+W(NG) is 2, representing that G and N know each other very well and think of highly of each other. The average of W(GN)+W(NG) is thus 1. Such condition may change accordingly as the number of data points in the merged data point group increases.

In some embodiments, a non-transitory computer readable medium may comprise instructions that, when executed, cause one or more processors to obtain a plurality of data point groups comprising a first data point group and a second data point group, determine a connection weight between the first data point group and the second data point group, and in response to determining the connection weight being over a preset threshold, merge the first and the second data point groups to obtain a merged data point group. Each data point group may comprise one or more data points, one or more of the data points are linked data points, one or more of the data points are linking data points, and each of the linked points is pointed to by a link from one or more of the linking data points. The connection weight may be based on a closeness of connection between one or more data points in the first data point group and one or more data points in the second data point group and based on a degree of evaluation of one or more data points from the first and second data point groups.

As such, the disclosed systems and methods can effectively provide weighted evaluation. Such evaluation can be reflected by interactions among people, and bi-directional confirmation between two people can significantly boost their ranking. Such system can be used in various applications, such as a business and employment oriented social networking platform, where interactions among platform users can help group and rank potential candidates. Accordingly, similar users can be merged together based on the disclosed methods, which are not attainable by existing methods such as page rank. From the ranked groups, employers can easily identify top level candidates for hiring.

FIG. 4A illustrates a flowchart of an example method 400 for providing weighted evaluation, according to various embodiments of the present disclosure. The method 400 may be implemented in various environments including, for example, the environment 100 of FIG. 1. The example method 400 may be implemented by one or more components of the system 102 (e.g., the processor 104, the memory 106). The example method 400 may be implemented by multiple systems similar to the system 102. The operations of method 400 presented below are intended to be illustrative. Depending on the implementation, the example method 400 may include additional, fewer, or alternative steps performed in various orders or in parallel.

At block 402, a plurality of data point groups may be obtained. Each data point group may comprise one or more data points, one or more of the data points may be linked data points, one or more of the data points may be linking data points, and each of the linked points may be pointed to by a link from one or more of the linking data points. At block 404, an inbound rank of each data point group may be obtained based on one or more inbound ranks of one or more data groups linking to the data point group. At block 406, an outbound rank of the each data point group may be obtained based on one or more outbound ranks of one or more data groups linked from the each data point group. At block 408, a group rank of the each data point group may be obtained based on the inbound rank and the outbound rank of the each data point group. At block 410, the data point groups may be processed according to the corresponding group ranks.

FIG. 4B illustrates a flowchart of an example method 420 for providing weighted evaluation, according to various embodiments of the present disclosure. The method 420 may be implemented in various environments including, for example, the environment 100 of FIG. 1. The example method 420 may be implemented by one or more components of the system 102 (e.g., the processor 104, the memory 106). The example method 420 may be implemented by multiple systems similar to the system 102. The operations of method 420 presented below are intended to be illustrative. Depending on the implementation, the example method 420 may include additional, fewer, or alternative steps performed in various orders or in parallel.

At block 422, a plurality of data point groups comprising a first data point group A and a second data point group B may be obtained. Each data point group may comprise one or more data points, one or more of the data points may be linked data points, one or more of the data points may be linking data points, and each of the linked points may be pointed to by a link from one or more of the linking data points. At block 424, a connection weight between the first data point group and the second data point group may be determined. The connection weight may be based on a closeness of connection between one or more data points in the first data point group and one or more data points in the second data point group and based on a degree of evaluation of one or more data points from the first and second data point groups. For example, the first data point group may be A, and the second data point group may be B. The connection weight may be W(AB)+W(BA), where W(AB)=I(AB)× Q(AB), the interaction weight I(AB) representing a closeness of connection between one or more data points in A and one or more data points in B, the quality weight Q(AB) represents a degree of evaluation of one or more data points in B by one or more data points in A, and W(BA) is the opposite of W(AB) as discussed above. At block 426, in response to determining the connection weight being over a preset threshold, the first and the second data point groups may be merged to obtain a merged data point group.

The techniques described herein are implemented by one or more special-purpose computing devices. The special-purpose computing devices may be hard-wired to perform the techniques, or may include circuitry or digital electronic devices such as one or more application-specific integrated circuits (ASICs) or field programmable gate arrays (FPGAs) that are persistently programmed to perform the techniques, or may include one or more hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques. Computing device(s) are generally controlled and coordinated by operating system software. Conventional operating systems control and schedule computer processes for execution, perform memory management, provide file system, networking, I/O services, and provide a user interface functionality, such as a graphical user interface ("GUI"), among other things.

Figure 5:
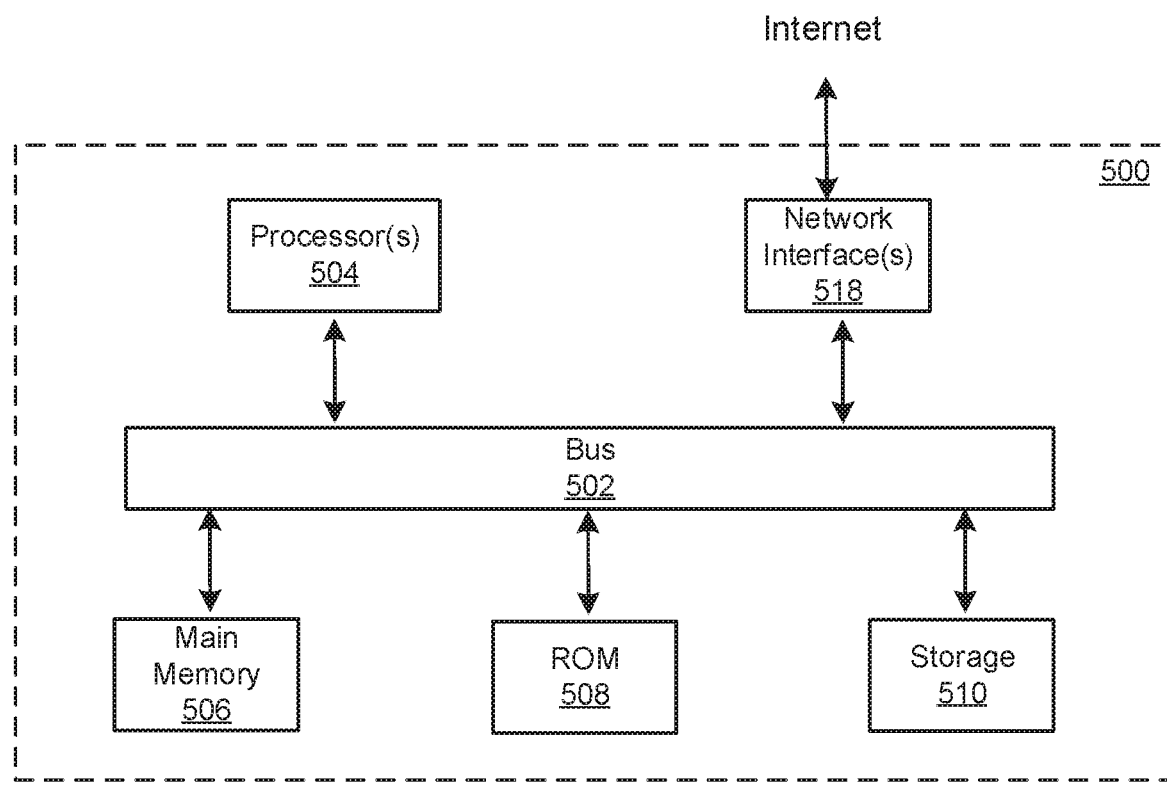
FIG. 5 is a block diagram that illustrates a computer system upon which any of the embodiments described herein may be implemented.

FIG. 5 is a block diagram that illustrates a computer system 500 upon which any of the embodiments described herein may be implemented. The system 500 may correspond to the system 102 described above. The computer system 500 includes a bus 502 or other communication mechanism for communicating information, one or more hardware processors 504 coupled with bus 502 for processing information. Hardware processor(s) 504 may be, for example, one or more general purpose microprocessors. The processor(s) 504 may correspond to the processor 104 described above.

The computer system 500 also includes a main memory 506, such as a random access memory (RAM), cache and/or other dynamic storage devices, coupled to bus 502 for storing information and instructions to be executed by processor 504. Main memory 506 also may be used for storing temporary variables or other intermediate information during execution of instructions to be executed by processor 504. Such instructions, when stored in storage media accessible to processor 504, render computer system 500 into a special-purpose machine that is customized to perform the operations specified in the instructions. The computer system 500 further includes a read only memory (ROM) 508 or other static storage device coupled to bus 502 for storing static information and instructions for processor 504. A storage device 510, such as a magnetic disk, optical disk, or USB thumb drive (Flash drive), etc., is provided and coupled to bus 502 for storing information and instructions. The main memory 506, the ROM 508, and/or the storage 510 may correspond to the memory 106 described above.

The computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor(s) 504 executing one or more sequences of one or more instructions contained in main memory 506. Such instructions may be read into main memory 506 from another storage medium, such as storage device 510. Execution of the sequences of instructions contained in main memory 506 causes processor(s) 504 to perform the process steps described herein. In alternative embodiments, hard-wired circuitry may be used in place of or in combination with software instructions.

The main memory 506, the ROM 508, and/or the storage 510 may include non-transitory storage media. The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 510. Volatile media includes dynamic memory, such as main memory 506. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

The computer system 500 also includes a communication interface 518 coupled to bus 502. Communication interface 518 provides a two-way data communication coupling to one or more network links that are connected to one or more local networks. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN (or WAN component to communicated with a WAN). Wireless links may also be implemented. In any such implementation, communication interface 518 sends and receives electrical, electromagnetic or optical signals that carry digital data streams representing various types of information.

The computer system 500 can send messages and receive data, including program code, through the network(s), network link and communication interface 518. In the Internet example, a server might transmit a requested code for an application program through the Internet, the ISP, the local network and the communication interface 518.

The received code may be executed by processor 504 as it is received, and/or stored in storage device 510, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

The various operations of example methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

As used herein, the term "or" may be construed in either an inclusive or exclusive sense. Moreover, plural instances may be provided for resources, operations, or structures described herein as a single instance. Additionally, boundaries between various resources, operations, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

What is claimed is:

1. A system for providing weighted evaluation, the system comprising:
    one or more processors; and
    a memory storing instructions that, when executed by the one or more processors, cause the system to:
        obtain a plurality of data point groups, wherein each data point group comprises one or more data points, one or more of the data points are linked data points, one or more of the data points are linking data points, and each of the linked data points is pointed to by a link from one or more of the linking data points;
        obtain an inbound rank of each data point group based on one or more inbound ranks of one or more data groups linking to the data point group;
        obtain an outbound rank of the each data point group based on one or more outbound ranks of one or more data groups linked from the each data point group;
        obtain a group rank of the each data point group based on the inbound rank and the outbound rank of the each data point group, wherein the inbound rank and the outbound rank of the each data point group are weighted based on an inbound-outbound balance coefficient; and process the data point groups according to the corresponding group ranks.

2. The system of claim 1, wherein:
to obtain the inbound rank of the data point group, the system is caused to iteratively obtain the inbound rank based on one or more inbound ranks of one or more other data point groups until a change in the iteration is below a preset threshold; and
to obtain the outbound rank of the data point group, the system is caused to iteratively obtain the outbound rank based on one or more outbound ranks of one or more other data point groups until a change in the iteration is below another preset threshold.

3. The system of claim 1, wherein:
the plurality of data point groups comprise a first and a second data point groups; and
to process the first and the second data point groups, the system is further caused to:
 determine a connection weight between the first data point group and the second data point group; and
 in response to determining the connection weight being over a preset threshold, merge the first and the second data point groups to obtain a merged data point group.

4. The system of claim 3, wherein:
the connection weight between the first data point group A and the second data point group B comprises W(AB) and W(BA);
W(AB) is based on an interaction weight I(AB) and a quality weight Q(AB);
the interaction weight I(AB) represents a closeness of connection between one or more data points in A and one or more data points in B; and
the quality weight Q(AB) represents a degree of evaluation of one or more data points in B by one or more data points in A.

5. The system of claim 3, wherein:
the connection weight between the first and the second data point groups is larger than any other connection weight between the first data point group and another data point group.

6. The system of claim 3, wherein:
to process the first and the second data point groups, the system is further caused to:
 obtain an inbound rank and an outbound rank of the merged data point group;
 update inbound and outbound ranks of all of the data point groups other than the first and second point groups; and
 remove the first and second data point groups.

7. The system of claim 6, wherein:
to process the first and the second data point groups, the system is further caused to obtain a connection weight of the merged data point group; and
the connection weight of the merged data point group is a weighted average of a connection weight with respect to the first data point group and another connection weight with respect to the second data point group.

8. The system of claim 7, wherein:
the preset threshold for the connection weight is based on a computing method of the connection weight of the merged data point group.

9. The system of claim 6, wherein:
the system is further caused to perform the connection weight determination and the merge for two or more other data point groups.

10. A computer-implemented method, the method being implemented by a computing system including one or more processors and storage media storing machine-readable instructions, the method comprising:
obtaining a plurality of data point groups, wherein each data point group comprises one or more data points, one or more of the data points are linked data points, one or more of the data points are linking data points, and each of the linked data points is pointed to by a link from one or more of the linking data points;
obtaining an inbound rank of each data point group based on one or more inbound ranks of one or more data groups linking to the data point group;
obtaining an outbound rank of the each data point group based on one or more outbound ranks of one or more data groups linked from the each data point group;
obtaining a group rank of the each data point group based on the inbound rank and the outbound rank of the each data point group, wherein the inbound rank and the outbound rank of the each data point group are weighted based on an inbound-outbound balance coefficient; and
processing the data point groups according to the corresponding group ranks.

11. The computer-implemented method of claim 10, wherein:
obtaining the inbound rank of the data point group comprises iteratively obtaining the inbound rank based on one or more inbound ranks of one or more other data point groups until a change in the iteration is below a preset threshold; and
obtaining the outbound rank of the data point group comprises iteratively obtaining the outbound rank based on one or more outbound ranks of one or more other data point groups until a change in the iteration is below another preset threshold.

12. The computer-implemented method of claim 10, wherein:
the plurality of data point groups comprise a first and a second data point groups; and
processing the first and the second data point groups comprises:
 determining a connection weight between the first data point group and the second data point group; and
 in response to determining the connection weight being over a preset threshold, merging the first and the second data point groups to obtain a merged data point group.

13. The computer-implemented method of claim 12, wherein:
the connection weight between the first data point group A and the second data point group B comprises W(AB) and W(BA);
W(AB) is based on an interaction weight I(AB) and a quality weight Q(AB);
the interaction weight I(AB) represents a closeness of connection between one or more data points in A and one or more data points in B; and
the quality weight Q(AB) represents a degree of evaluation of one or more data points in B by one or more data points in A.

14. The computer-implemented method of claim 12, wherein:
the connection weight between the first and the second data point groups is larger than any other connection weight between the first data point group and another data point group.

15. The computer-implemented method of claim 12, wherein:
processing the first and the second data point groups comprises:
obtain an inbound rank and an outbound rank of the merged data point group;
update inbound and outbound ranks of all of the data point groups other than the first and second point groups; and
remove the first and second data point groups.

16. The computer-implemented method of claim 15, wherein:
processing the first and the second data point groups comprises obtaining a connection weight of the merged data point group; and
the connection weight of the merged data point group is a weighted average of a connection weight with respect to the first data point group and another connection weight with respect to the second data point group.

17. The computer-implemented method of claim 16, wherein:
the preset threshold for the connection weight is based on a computing method of the connection weight of the merged data point group.

18. The computer-implemented method of claim 15, further comprising:
performing the connection weight determination and the merge for two or more other data point groups.

19. A non-transitory computer readable medium comprising instructions that, when executed, cause one or more processors to:
obtain a plurality of data point groups comprising a first data point group and a second data point group, wherein each data point group comprises one or more data points, one or more of the data points are linked data points, one or more of the data points are linking data points, each of the linked points is pointed to by a link from one or more of the linking data points, each data point group has an inbound rank and an outbound rank, and each data point group has a group rank based on the inbound rank and the outbound rank weighted based on an inbound-outbound balance coefficient;
determine a connection weight between the first data point group and the second data point group, wherein the connection weight is based on a closeness of connection between one or more data points in the first data point group and one or more data points in the second data point group and based on a degree of evaluation of one or more data points from the first and second data point groups; and
in response to determining the connection weight being over a preset threshold, merge the first and the second data point groups to obtain a merged data point group.

20. The non-transitory computer readable medium of claim 19, wherein:
the first data point group is A and the second data point group is B,
the connection weight is $W(AB)+W(BA)$;
$W(AB)$ is based on an interaction weight $I(AB)$ and a quality weight $Q(AB)$;
$W(BA)$ is based on an interaction weight $I(BA)$ and a quality weight $Q(BA)$;
the interaction weight $I(AB)$ and $I(BA)$ each represents a closeness of connection between one or more data points in A and one or more data points in B; and
the quality weight $Q(AB)$ represents a degree of evaluation of one or more data points in B by one or more data points in A; and
the quality weight $Q(BA)$ represents a degree of evaluation of one or more data points in A by one or more data points in B.

* * * * *